(12) United States Patent
Li Volsi

(10) Patent No.: US 7,956,824 B2
(45) Date of Patent: Jun. 7, 2011

(54) LIGHT EMITTING ELEMENT DRIVER DEVICE

(75) Inventor: Nicola Li Volsi, Gravina di Catania (IT)

(73) Assignee: STMicroelectronics S.r.l., Agrate Brianza (IT)

(*) Notice: Subject to any disclaimer, the term of this patent is extended or adjusted under 35 U.S.C. 154(b) by 984 days.

(21) Appl. No.: 11/828,847

(22) Filed: Jul. 26, 2007

(65) Prior Publication Data

US 2009/0026981 A1 Jan. 29, 2009

(51) Int. Cl.
*G05F 1/02* (2006.01)

(52) U.S. Cl. ........ 345/76; 345/77; 345/78; 345/79; 345/80; 345/81; 345/82; 345/83; 345/102; 345/204; 315/169.3

(58) Field of Classification Search .......... 345/76–83, 345/102, 204; 315/169.3
See application file for complete search history.

(56) References Cited

U.S. PATENT DOCUMENTS

| | | | | |
|---|---|---|---|---|
| 5,432,526 A * | 7/1995 | Hyatt | | 345/87 |
| 6,380,686 B1 * | 4/2002 | Kim et al. | | 315/169.2 |
| 7,042,425 B2 * | 5/2006 | Yamaguchi et al. | | 345/76 |
| 7,468,717 B2 * | 12/2008 | Hudson | | 345/98 |
| 7,728,577 B2 * | 6/2010 | Yu et al. | | 324/76.83 |
| 2002/0005826 A1 * | 1/2002 | Pederson | | 345/82 |
| 2006/0007111 A1 * | 1/2006 | Moon et al. | | 345/102 |
| 2007/0132674 A1 * | 6/2007 | Tsuge | | 345/77 |
| 2008/0238950 A1 * | 10/2008 | Saglam | | 345/690 |

OTHER PUBLICATIONS

STMicroelectronics, "Low voltage 16-Bit constant current LED sink driver with auto power saving," STP16CPS05, http://www.st.com/stonline/books/pdf/docs/12569.pdf, 26 pages.

* cited by examiner

*Primary Examiner* — Richard Hjerpe
*Assistant Examiner* — Jeffrey Steinberg
(74) *Attorney, Agent, or Firm* — Lisa K. Jorgenson; Robert Iannucci; Seed IP Law group PLLC

(57) ABSTRACT

A driver device for driving light emitting elements comprises a data latch having an input coupled to an input signal, a current control circuit having an input coupled to the data latch, and an output coupled to the input of an output stage, the latter being configured to drive the light emitting elements. The driver device has a power control circuit having an input coupled to the output of the data latch and an output coupled to the input of the current control circuit. The power control circuit is configured to control the current control circuit and the latter is configured to deliver a first current when the data inputted to the power control circuit is in a first state and a second current when at least part of the data inputted to the power control circuit is in a second state.

27 Claims, 4 Drawing Sheets

LIGHT EMITTING ELEMENT DRIVER DEVICE

BACKGROUND

1. Technical Field

The present invention relates to a driver device for driving light emitting elements.

More particularly, the present invention relates to a driver device for driving light emitting elements (LEDs) in electronic systems.

2. Description of the Related Art

Extending battery life and reducing power consumption are major challenges facing electronic system designers.

This particularly applies both to portable electronic systems, such as cell phones, digital cameras, notebooks, and to those electronic systems that operate even when they are disconnected from the mains, using a battery and/or solar cell supply, as well as to any other electronic system in which energy saving is a primary design requirement.

Therefore, the designers of these electronic systems have to face both the desire of reducing the size of the electronic devices used in such systems (and the battery size) and the desire of reducing power consumption for operation thereof, while extending battery life.

Light emitting diodes (LEDs) are commonly used in such electronic systems.

These LEDs find application, for instance, in LED panels for home appliances, LED back-light LCD panels of mobile phones, LCD signboards, etc.

At present, LED panels are designed with SIPO (Serial Input Parallel Output) driver devices which are electrically coupled together in a so-called daisy-chain configuration.

Particularly, the LEDs of a panel may be driven by these driver devices, each of which can supply a constant current to such LEDs.

Referring to FIG. 1, which shows an approach used for an LED display driving circuit, a LED matrix 1 is shown, which is driven by a driver system 2 having a plurality of driver devices 2A, . . . , 2E.

The driver devices 2A, . . . , 2E are coupled together in a "daisy chain configuration", which means, for example, that the driver device 2D has at its input the output data of the driver device 2C and that this driver device 2D has data at its output for the driver device 2E.

It is further noted that the LED matrix 1 receives, for instance, a 4 V supply voltage, such voltage being generated by a DC/DC switch-mode power supply 3 from a power source that can provide a voltage ranging from 5 V to 35 V.

Still referring to FIG. 1, the driver system 2 is controlled by a microcontroller 4 which can receive control data 5 from an interface panel 6.

The driver system 2 and the microcontroller 4 receive, for instance, a 3.3 V supply voltage, such voltage being generated by a DC/DC converter 7 from a power source that can provide a voltage ranging from 5 V to 35 V.

Particularly, in the specific circuit diagram of FIG. 1, the driver system 2 comprises five driver devices 2A, . . . , 2E, each having a control logic and an analog output stage for driving the LEDs of the LED matrix 1 by a constant current, and being further characterized by having an N-bit SIPO shift register, wherein data is serially loaded into such register but appears to be simultaneously collected, at a predetermined time from all outputs in parallel.

For instance, the driver device 2A is designed to serially receive control data 5 from the microcontroller 4 and the output stage of such driver device 2A has N driver channels, each being able to drive one or more LEDs of the LED matrix 1.

In the specific illustration of FIG. 1, the LED matrix 1 is composed of eighty LEDs and each driver device 2A, . . . , 2E can drive sixteen LEDs.

In other words, each driver device 2A, . . . , 2E has an output stage with sixteen separate driver channels, each of such driver channels being adapted to drive one LED of the LED matrix 1.

The current flowing through each driver channel has to be a constant current and for such driver devices 2A, . . . , 2E to provide such constant current, there is a continuous consumption of a certain amount of current that flows through the device and/or through a dedicated pin.

Particularly, an external resistor 2F is used with the driver device, which resistor is coupled to a current controller 2G to provide constant supply current to the LEDs of the LED matrix 1.

While the circuit diagram of FIG. 1 provides undisputable advantages, such as the possibility of integrating the driver devices 2A, . . . , 2E into a single integrated circuit, it still suffers from certain drawbacks, e.g., that of consuming power even when the driver system 2 does not receive at its input the data 5 required for controlling the LEDs of the matrix from the microcontroller 4.

In other words, the driver system 2 dissipates energy even when there is no need for all the LEDs of the matrix 1 to be on.

In fact, these circuit diagrams often have less than 50% of the driver devices on at the same time.

For example, in a video display LED application that can use even hundreds of thousands of devices, current consumption may be on the order of a few tens of amperes.

As an alternative, driver systems have been provided which are implemented through the use of discrete devices.

While these driver systems allow some savings in dissipated power, they still suffer from the drawback of higher costs and greater complexity as compared with integrated configurations.

BRIEF SUMMARY

In view of the configurations as described above, the present disclosure teaches how to significantly reduce energy dissipation in driver devices that find application, for instance, in one-color, multi-color and full-color display LEDS, as well as in one-color and multi-color LEDS signboards and LED back-light LCD panels.

One embodiment of the invention provides a driver device ensuring a more efficient energy consumption, by affording automatic power savings when there is no need for one or more LEDs to be on, and switching back to an operating state without requiring any external action.

Furthermore, in one embodiment of the present invention, the driver device reduces power dissipation without affecting the other operating features of the device as compared with a driver device according to prior art.

Finally, one embodiment of the invention provides more power-efficient driver systems.

DETAILED DESCRIPTION

Figure 1:
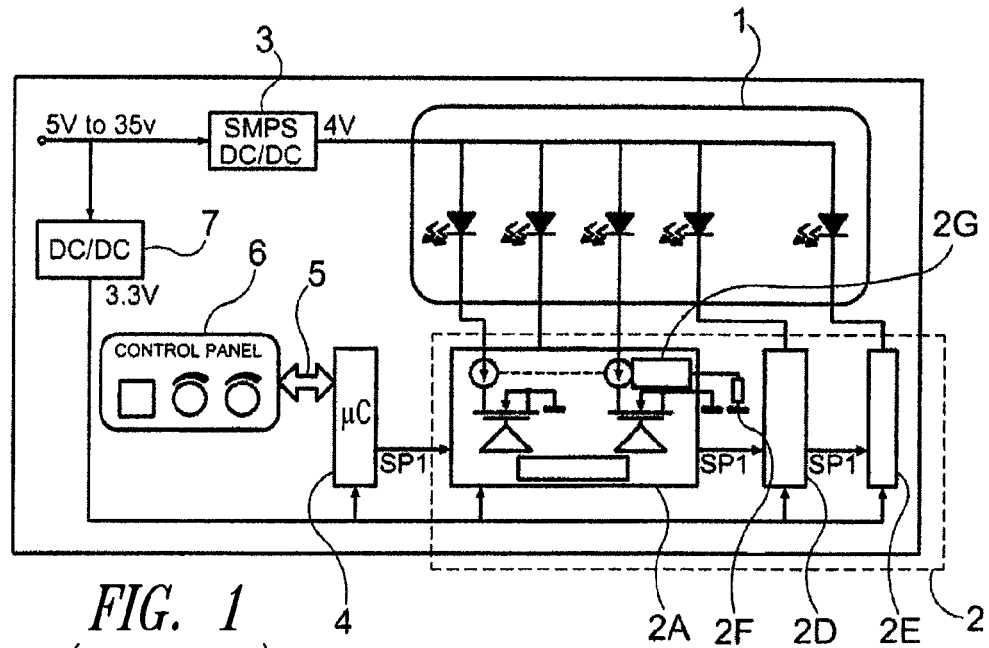
FIG. 1 is a circuit diagram for driving a LED display according to the prior art.
Figure 2:
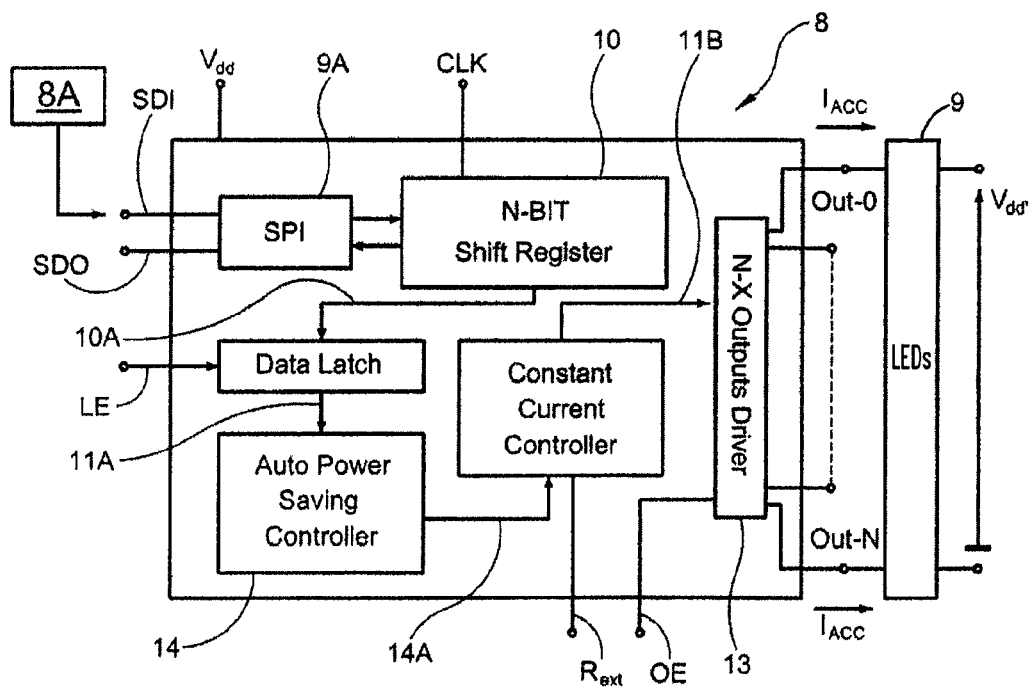
FIG. 2 is a circuit block diagram for driving a plurality of LED light emitting elements according to one embodiment of the present invention.
Figure 3:
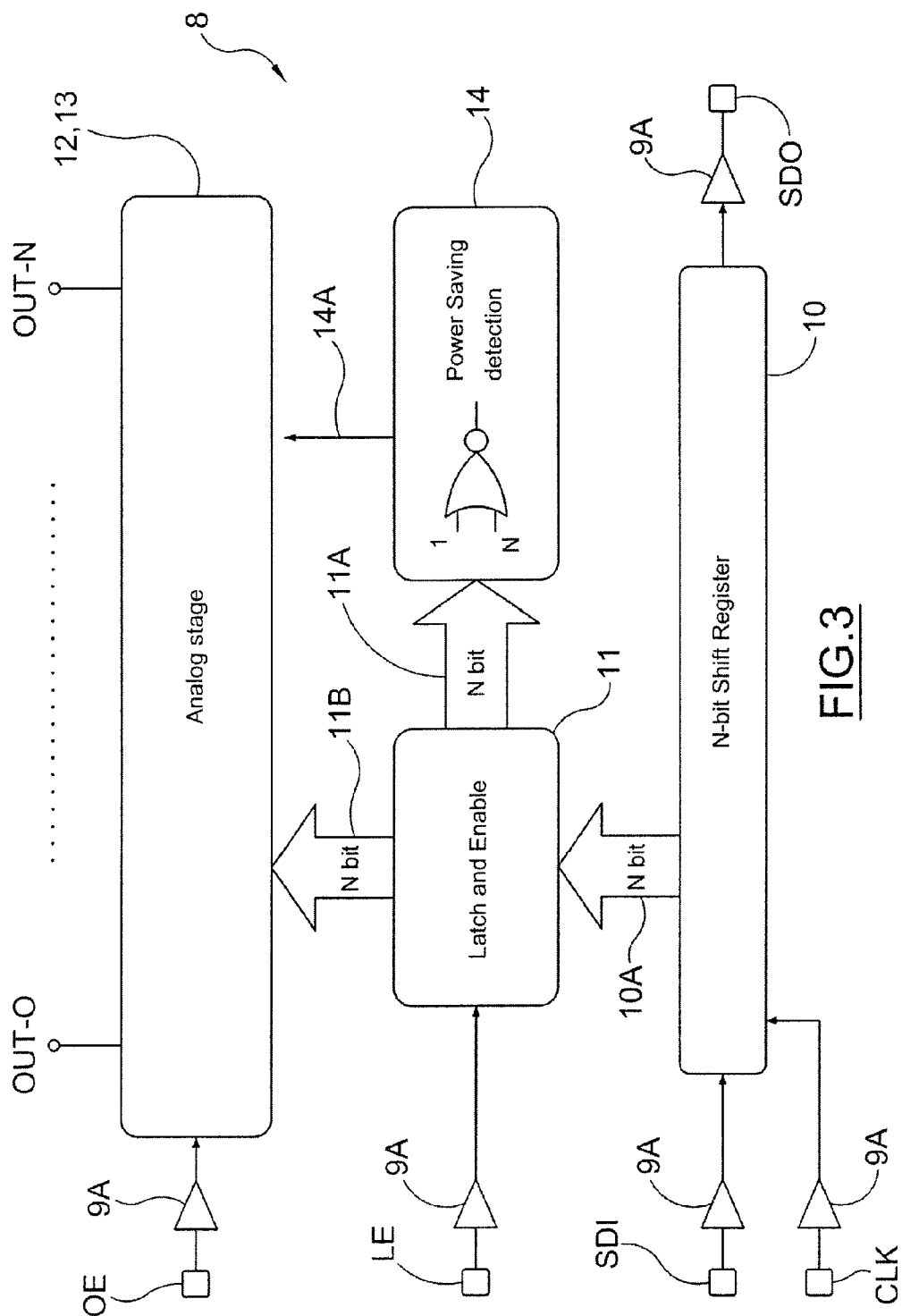
FIG. 3 is a cable-and-trunk schematic of the digital architecture of the block diagram of FIG. 2.

FIGS. 2 and 3 show a driver device 8 for driving a plurality of light emitting elements 9 (FIG. 2) and its digital implementation (FIG. 3) respectively.

The driver device 8 is designed to be coupled to a microcontroller 8A, which can receive the control data generated by an interface panel (not shown), such data being designed to control (turn on and/or off) the light emitting elements 9 through the driver device 8.

Furthermore, the driver device 8 receives a supply voltage Vdd whereas the plurality of light emitting elements 9 receives a supply voltage Vdd'.

The driver device 8 includes a SPI data interface 9A, a shift register 10, a data latch 11, a current control circuit 12 and an output stage 13.

Advantageously, the driver device 8 further includes a power control circuit 14 electrically coupled between the data latch 11 and the current control circuit 12.

Particularly, the power control circuit 14 can control the current control circuit 12 to deliver a first current $I_{OFF}$ for auto power-up of the driver device 8 and a second current $I_{ON}$ for auto power shut-down of the driver device 8 without requiring any external action, as shown in greater detail hereinafter.

It should be noted, still with reference to FIG. 3, that the SPI data interface 9A of the driver device 8 can receive a serial data input line SDI (Serial Data Input), a clock line CLK, a line for the signal representing latch enable data LE, a line for an output enable signal OE, and such SPI data interface 9A can provide a serial data output line SDO (Serial Data Output).

The output stage 13 of the driver device 8 has a plurality of outputs OUT-0, ..., OUT-N, where N stands for the number of driver channels of the output stage, wherein each of the N outputs can drive one or more light emitting elements 9.

It should be noted that the clock line CLK represents the clock signal of the driver device 8, and that such clock signal CLK can take various values depending on the specific needs for which the driver device 8 is intended, such frequencies ranging, for instance, from a few hundreds kilohertz to a few tens megahertz.

In one embodiment, the clock signal CLK can reach 30 MHz.

The serial data line SDI carries the serial data input to the driver device 8, whereas the serial data line SDO carries the serial data output from the driver device 8.

The latch enable signal LE represents the control for the data latch 11, i.e., the signal for enabling or disabling the data latch 11 to hold the data contained at that time on the data latch, whereas the output enable signal OE represents the control that enables the light emitting elements 9.

The shift register 10 is a N-bit SIPO shift register of the SIPO type (Serial Input Parallel Output), whose circuit implementation and operation are well known to those of ordinary skill in the art and will not be described herein, and which can receive at its input the data on the serial data lines SDI and the clock line CLK and provide at the same time at its output, on a data line 10A of N-bit width, the data required by the data latch 11.

In other words, the shift register 10 is in signal communication with the data latch 11.

The data latch 11, whose circuit implementation and operation are also known and will not be described above, receives at its input the data on the data line 10A and is controlled by means of the latch enable signal LE.

Particularly, the data latch 11 generates at its output, on a data line 11A of N-bit width, the data required by the power control circuit 14, which is designed to control the current control circuit 12, as well as the output stage 13 of the driver device 8.

It should be noted that the data latch 11 stores the data on the line 10A into a register (not shown), when the latch enable signal LE is of high value, and such data latch 11 remains idle when the latch enable signal LE is of low value.

In other words, the data latch 11 is designed to hold the data when a high value is on the latch enable line LE, and to transfer it from the input to the output when a low value is on the latch enable line 11.

The power control circuit 14 receives at its input the output data line 11A of the data latch 11 and is coupled by its output to the current control circuit 12 through a data line 14A also having a N-bit width.

In one embodiment, the power control circuit 14 is implemented by a NOR logic gate, e.g., using CMOS technology, having N input lines and one output line.

In other words, the N input lines of the power control circuit 14 coincide with the data line 11A, whereas the output line of the power control circuit 14 coincides with the data line 14A.

The current control circuit 12 receives at its input the data line 14A and is electrically coupled at its output with the output stage 13, which can drive the light emitting elements 9 through the plurality of outputs OUT-0, ..., OUT-N.

It should be noted that the electrical coupling between the current control circuit 12 and the output stage 13 occurs through a data line 11B also having a N-bit width.

Particularly, the output stage 13 receives at its input an output enable signal OE to enable its plurality of outputs OUT-0, ..., OUT-N to deliver a power-up current $I_{ACC}$.

The plurality of outputs OUT-0, ..., OUT-N responds to the output enable signal OE, by powering up the light emitting elements 9, when this signal is of low value, and by shutting down the plurality of outputs OUT-0, ..., OUT-N when such signal is at a high value.

The current control circuit 12 is, for instance, implemented as an analog stage having N current generators, which provide the constant supply current $I_{ACC}$, varying, for instance, from a few milliamperes to a few hundreds of milliamperes.

In other words, the current control circuit 12 can provide an output voltage that can be used to drive one or more light emitting elements 9 connected in series or in parallel with one another.

For instance, in a preferred embodiment, the driver device 8 ensures up to 20 V driving voltage.

In the specific embodiment of FIG. 2, the constant supply current $I_{ACC}$ is delivered to the light emitting elements 9 by providing an electric connection of the current control circuit 12 to a resistive element $R_{EXT}$.

It should be noted that, in the preferred embodiment, the driver device 8 is formed as a single integrated circuit, and the above resistive element $R_{EXT}$ is located outside the driver device 8.

For instance, such resistive element $R_{EXT}$ is embodied by a resistor having a resistance from 0.5 KOhm to 4.5 KOhm.

In operation, the driver device 8 drives the light emitting elements 9 through the output stage 13 by the constant supply current $I_{ACC}$ in response to the data on the serial data line SDI, whenever such data requires the light emitting elements 9 to be powered on (for instance) by a control imparted through the control panel controlled by the microcontroller 8A.

Particularly, for one or more light emitting elements 9 to be powered up, a constant voltage $V_{dd}$ is provided at the ends of the external resistor $R_{EXT}$, to generate a current proportional to the ratio of the voltage to the external resistance $R_{EXT}$.

This current is mirrored by the current control circuit 12 onto the N outputs of the output stage 13 to generate the constant supply current $I_{ACC}$ which is thus proportional to the current flowing through the external resistor $R_{EXT}$.

In order to reduce energy dissipation, the power control circuit 14 will control the current control circuit 12, the latter being designed to deliver:

a first current $I_{OFF}$ when the data on the data line 11A at the input of the power control circuit 14 is in a first state; and a second current $I_{ON}$ when at least one of said data on the data line 11A at the input of the power control circuit 14 is in a second state.

Particularly, the power control circuit 14 can exert its control to shut down (current $I_{OFF}$) the N current generators that form the analog circuitry of the current control circuit 12 or to power up (current $I_{ON}$) the N current generators that form the analog circuitry of the current control circuit 12 in response to the data on the data line 11A.

Therefore, the power control circuit 14 is a purely digital circuit and operates on the current control circuit 12, which is implemented as an analog circuit, through the data line 14A, to alternately shut down, by said first current $I_{OFF}$ ($I_{OFF}$ being proportional to $I_{ACC}$) or power up, by said current $I_{ON}$ ($I_{ON}$ being proportional to $I_{ACC}$) the N current generators of the current control circuit 12.

Particularly, it should be noted that each output of the output stage 13 has an operational circuit associated thereto, which has to be driven, by a reference voltage circuit, through the current $I_{ON}$ (for power up) or the current $I_{OFF}$ (for shut down).

Then, the power control circuit 14 receives data from the data latch 11, through the data line 11A, and operates on the current control circuit 12 by shutting down or powering up the circuitry contained therein, to reduce its power consumption.

The following conditions may be particularly found:

I) the N current generators that form the analog circuitry of the current control circuit 12 are off when the data on the line 11A at the input of the power control circuit 14 are in a first state (auto power shut-down state)

II) the N current generators that form the analog circuitry of the current control circuit 12 are on when at least part of the data at the input 11A of the power control circuit 14 are in a second state (auto power up state)

Therefore, the power control circuit 14 implements the power shutdown feature for the light emitting elements 9 when the data on the N lines of the data line 11A is in such first state and implements the auto power up feature when at least one of the N lines of the data line 11A switches to a second state.

Such switching process can provide considerable power savings in the operation of the driver device 8 and is operable without any external action, i.e., no signal or specific microcontroller action.

In other words, the power control circuit 14 ensures logical control of the current control circuit 12 by detecting the state of the data on the data line 11A and imparts to the current control circuit 12 the first current $I_{OFF}$ if the microcontroller 8A has generated no power up control for light emitting elements 9 or the second current $I_{ON}$ if such microcontroller 8A has generated at least one power up control even for one light emitting element 9.

Thus, the power control circuit 14 can detect the logical state of data on all the N lines of the data line 11A.

Figure 5:
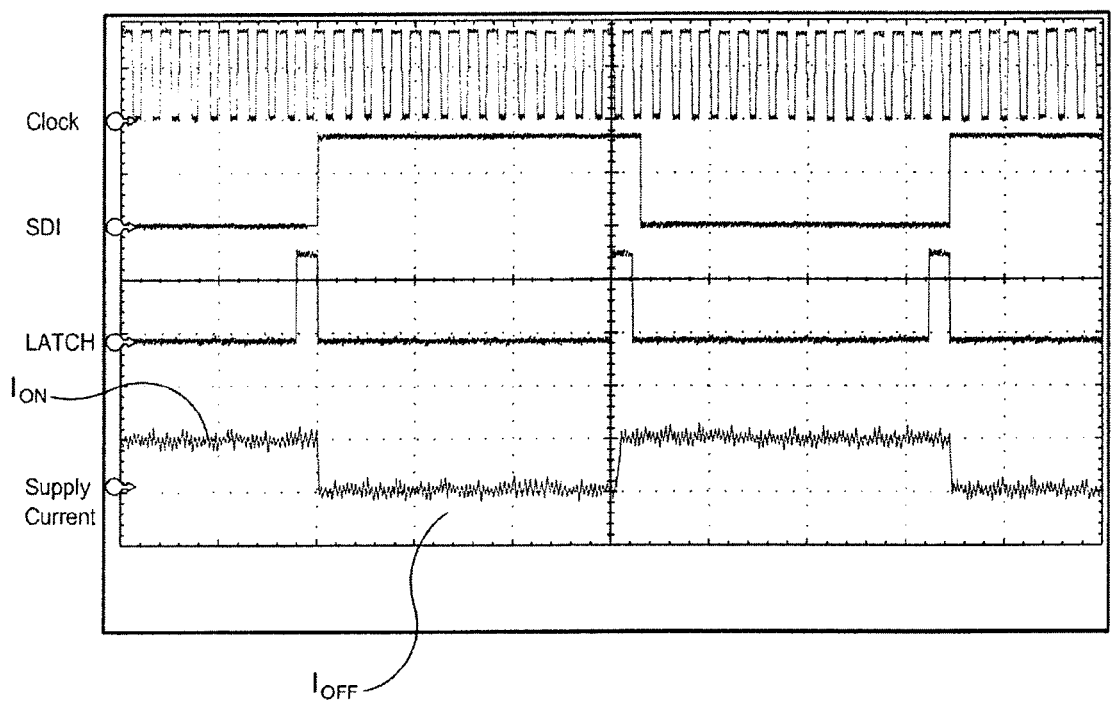
FIG. 5 is a diagram showing time variations of certain significant signals of the driver device of FIG. 1.

Particularly, still with reference to FIG. 5:

if the logical state of the data on the data line 11A is low and the logical state of the data on the latch enable data line LE is high, then the power control circuit 14 controls the current control circuit 12 to deliver the current value $I_{OFF}$ which is lower than the current value $I_{ON}$ and if the logical state of the latch enable signal IE is high and at least one of the N lines of the data line 11A has part of the data of high logical value, then the power control circuit 14 controls the current control circuit 12 to deliver the current value $I_{ON}$ required for powering up the light emitting elements 9.

It should be noted that the current value $I_{OFF}$ ranges from a few tens of microamperes to a few hundred microamperes.

In one embodiment, the value of the current $I_{OFF}$ ranges from 70 μA e 100 μA.

In one embodiment, the value of the current $I_{ON}$ ranges from a few milliamperes to a few tens of milliamperes.

In one embodiment, the value of the current $I_{ON}$ ranges from 5 mA to 80 mA.

As a result, when there is no need for the light emitting elements 9 to be on, the current control circuit 12, depending on what is detected by the power control circuit 14 (the logical state of the data on the data line 11A is low and the logical state of the latch enable state LE is high), imparts the current $I_{OFF}$ which is lower than the current value $I_{ON}$ required for the current control circuit 12 to be able to supply the light emitting elements 9 with the constant power up current $I_{ACC}$.

For instance, if one of the N outputs of the output stage of a driver device is imparted, like in prior art, a constant power up current $I_{ACC}$ of 20 mA then, considering that the resistance value of the resistor $R_{EXT}$ is of about one KOhm, such driver device would require a constant current $I_{ON}$ of about 4 mA.

Such a driver device dissipates energy regardless of whether there is the actual need to power up one light emitter and if there is no need to power up such light emitting emitter.

On the other hand, thanks to the presence of the power control circuit 15, the current control circuit 12 may be controlled for delivery of the current value $I_{OFF}$ when the logical state of the data on the data line 11A is low and the logical state of the latch enable signal LE is high, i.e., when the microcontroller 8A does not control power up of one or more light emitting elements 9.

In other words, a driver device 8 is obtained that has a lower power dissipation because the N generators of the current control circuit 12 are driven by a current $I_{OFF}$ that is lower than the current value $I_{ON}$.

It should be noted that this first state of the data line 11A may coincide with the time when the driver device 8 has been first powered up.

In this case, the driver device 8 comprises POWER ON RESET (POR) circuitry, whose function is to reset the logical circuitry, i.e., the shift register 10 and the data latch 11.

Thus, all the data on the shift register 10 and the data latch 11 are set to a low logical value to prevent any driver of the output stage 13 from being unduly on upon power up of the driver device 8.

It should be noted that the data on the data latch 11 and the resulting state of the power control circuit 14 have to correspond to the driver device 9 in the auto power shutdown state and, only after a first latch of some active data (i.e., capable of driving a driver device), the driver device 8 will power up the circuitry of the current control circuit 12.

In the particular illustration of FIG. 2, the driver device 8 is arranged to drive sixteen light emitting elements 9, which are preferably embodied by light emitting diodes (LEDs), whereby the N-bit data lines 10A, 11A and 11B have a sixteen bit width.

Therefore, the driver device 8 is a sixteen bit device that can drive sixteen LEDs.

Figure 4:
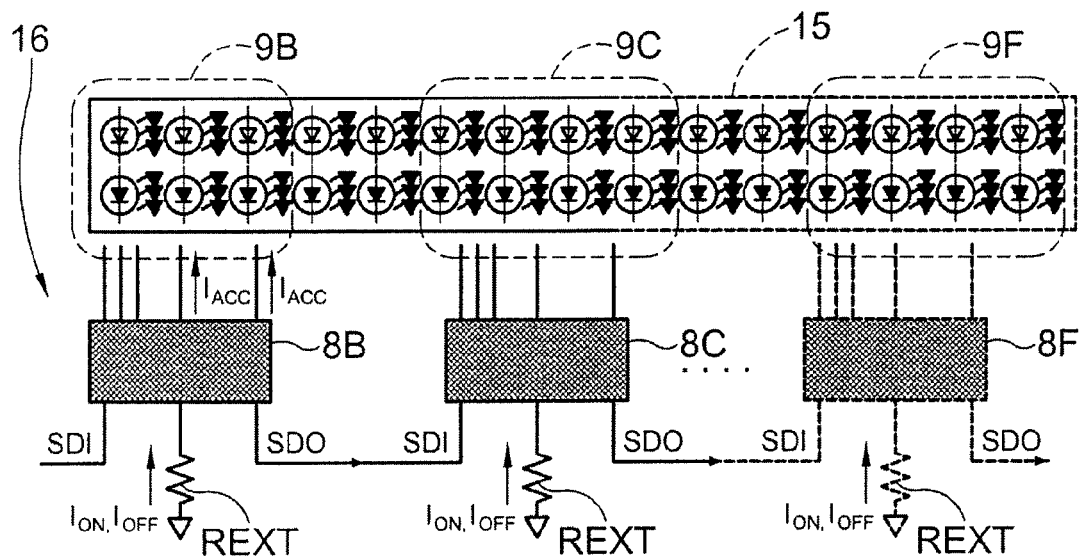
FIG. 4 shows a possible use of the device of FIG. 2 when it is used for making a LED matrix driving system.

Referring to FIG. 4, a driver system 16 is shown therein, which comprises multiple driver devices 8 that can be electrically coupled together in daisy chain cascading arrangement to drive a LED matrix 15, e.g., composed of eighty LEDs.

In the specific illustration of FIG. 4, the driver system 16 is shown to comprise, for example, five different driver devices 8B, ..., 8F, each being designed to drive an array of sixteen LEDs 9B, ..., 9F.

For example, the LED array 9B is coupled to the driver device 8B through the N lines OUT-0, ..., OUT-N of the output stage 13, a similar arrangement being provided for the remaining arrays of light emitting elements 9C, ... 9F.

The daisy chain configuration allows utilization of the serial data input lines SDI and the serial output data line SDO of each driver device 8B, ..., 8F.

This means that the $(n)^{th}$ driver device, such as the device 8C has at its input the data output from the $(n-1)^{th}$ device, such as the device 8B, and has at its output the data for the $(n+1)^{th}$ device, such as the device 8D.

Particularly, as shown in FIG. 4, the serial data input line SDI is the data line that carries the data generated by the microcontroller 8A, whereas the serial data output line SDO is the data line that transfers the data generated by one of the driver devices to the other driver devices.

Advantageously, the driver system 16 allows independent driving of each LED array 9B, ..., 9F, as the latter are coupled to respective driver devices 8B, ..., 8F, each detecting, thanks to its respective power control circuit 14, the conditions to implement the auto power shutdown and auto power up features, as mentioned above with reference to FIGS. 2 and 3.

Figure 6:
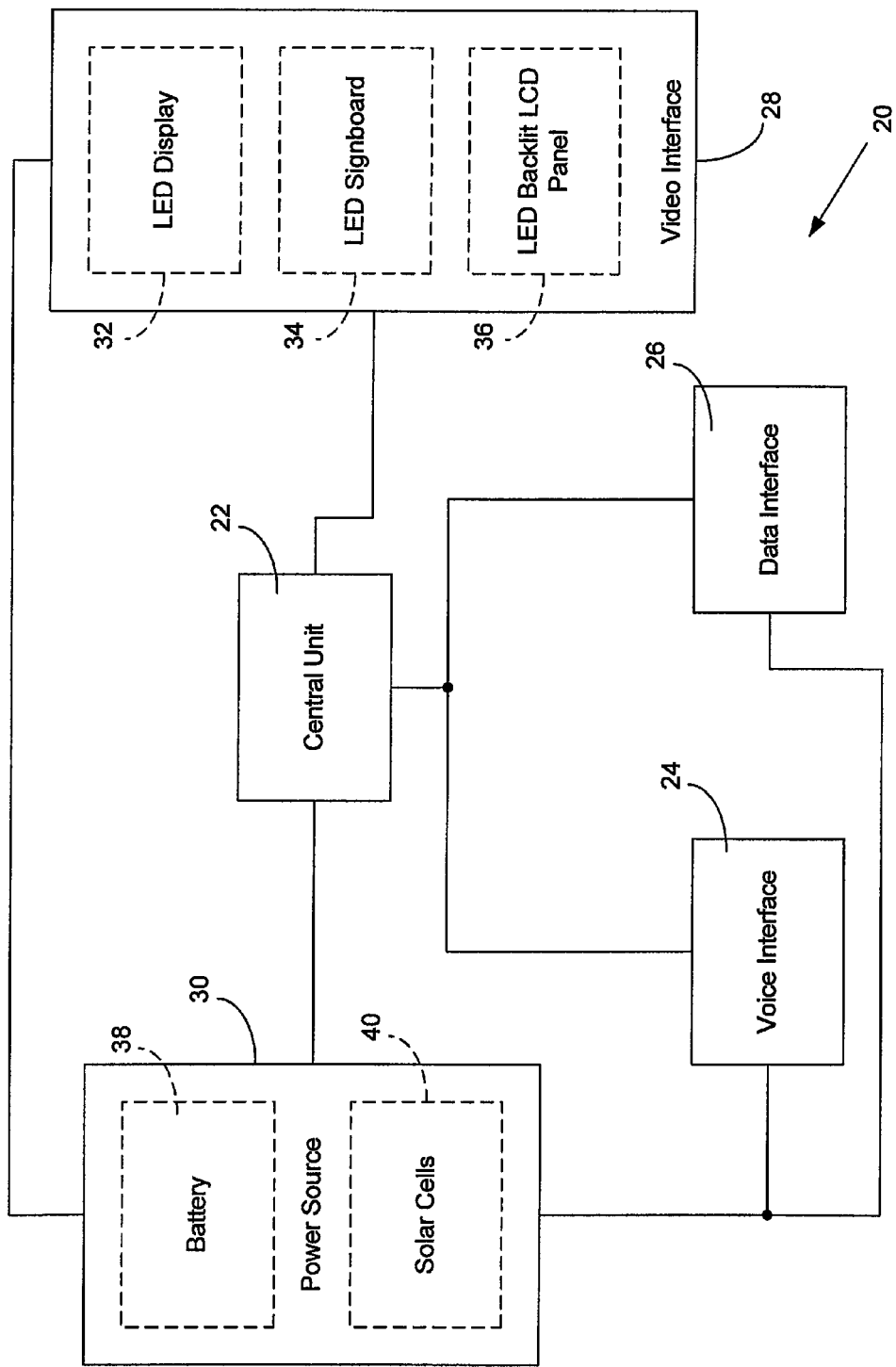
FIG. 6 is a block diagram of an electronic apparatus according to one embodiment of the invention.

Such driver system 16 or such a driver circuit 8 may advantageously find application in an electronic apparatus 20 as shown in FIG. 6. The apparatus 20 comprises:
a central unit 22, such as a microcontroller or central processing unit (CPU);
a plurality of circuits to accomplish specific tasks, such as a voice interface 24, a data interface 26, and a video interface 28; and
an energy source 30 for power supply to said central unit and said plurality of circuits.

Particularly, the central unit can control the operation of said plurality of circuits 24, 26, 28. The video interface 28 could be implemented as an LED display 32; an LED signboard 34; or an LED backlit LCD panel 36. Each implementation 32, 34, 36 of the video interface 28 preferably includes the matrix 15 of the plurality of light emitting elements 9, and the driver circuit 8, or, alternatively, the driver system 16, to drive said light emitting elements of said video interface.

The electronic apparatus 20 can be a home appliance, having as video interface an LED display, or an LED signboard or an LED back-light LCD panel; a portable electronic system, such as a cell phone, digital camera, notebook, etc.; or any other electronic system in which energy saving is a primary desire.

Particularly the LED display can be of the one-color, multi-color or full-color LED display type, and the LED signboard can be of one-color or multi-color LED signboard type.

The driver circuit 8 or the driver system 16 are embodied as described above with reference, respectively, to FIG. 2 and FIG. 4.

The energy source 30 of the electronic apparatus 20 is embodied, for instance, by a battery 38, one or more solar cells 40, or any other energy source, such as a standard power supply.

It will be appreciated that the electronic apparatus comprises the driver circuit 8 (or the driver system 16) which provides considerable power savings, while ensuring the same performances as a prior art driver system.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driver device comprising:
a data latch having an input, configured to receive an input signal, and an output;
an output stage having an input and being structured to drive a plurality of light emitting elements;
a current control circuit having an input coupled to said data latch and an output coupled to the input of the output stage; and
a power control circuit having an input coupled to the output of said data latch and an output coupled to the input of the current control circuit, said power control circuit being configured to control said current control circuit and the current control circuit being configured to deliver:
a first current when data at the input of said power control circuit is in a first state; and
a second current when at least part of said data at the input of said power control circuit is in a second state.

2. A driver device as claimed in claim 1, wherein said first current is lower than the second current.

3. A driver device as claimed in claim 1, comprising:
an input interface configured to receive a first serial data signal and to output a second serial data signal; and
a shift register having an input coupled to the input interface and an output coupled to said data latch, said data latch having at its input a latch enable signal for enabling said data latch.

4. A driver device as claimed in claim 3, wherein said power control circuit detects a logic state of data on a signal line at the output of said data latch, said signal line being composed of N data lines, and if the logic state of the data on said N data lines of said signal line is low and a logic state of said latch enable signal is high, said power control circuit delivers said first current, which is lower than said second current, the second current being sufficient to enable said current control circuit to deliver a constant current for powering up said light emitting elements.

5. A driver device as claimed in claim 4, wherein said first current ranges from 70 µA to 100 µA.

6. A driver device as claimed in claim 3, wherein said power control circuit detects a logic state of data on a signal line at the output of said data latch, said signal line being composed of N data lines, and if a logic state of said latch enable signal is high and if a datum on at least one of the N data lines of said signal line is of a logic high value, then said power control circuit delivers said second current sufficient to enable said current control circuit to deliver a constant current for powering up said light emitting elements.

7. A device as claimed in claim 6, wherein said first current ranges from 5 mA to 80 mA.

8. A driver device as claimed in claim 1, wherein said output stage has N output lines, each being coupled to a respective light emitting element.

9. A driver device as claimed in claim 1, wherein said driver device is coupled to a resistive element.

10. A driver device as claimed in claim 1, wherein said power control circuit is a circuit implemented by a NOR logic gate having N inputs.

11. A driver device as claimed in claim 1, wherein said plurality of light emitting elements are light emitting diodes.

12. A system comprising:
an array of light emitting elements; and
a driver device that drives the array of light emitting elements, the driver device comprising:
    a data latch having an input, configured to receive an input signal, and an output;
    an output stage having an input and being structured to drive a plurality of light emitting elements;
    a current control circuit having an input coupled to said data latch and an output coupled to the input of the output stage; and
    a power control circuit having an input coupled to the output of said data latch and an output coupled to the input of the current control circuit, said power control circuit being configured to control said current control circuit and the current control circuit being configured to deliver:
        a first current when data at the input of said power control circuit is in a first state; and
        a second current when at least part of said data at the input of said power control circuit is in a second state.

13. The system of claim 12, wherein:
the array of light emitting elements is one of a plurality of arrays of light emitting elements; and
the device driver is one of a plurality of driver devices respectively coupled to the plurality of arrays of light emitting elements, each device driver being structured to independently drive a corresponding one of the arrays of light emitting units, the device drivers being coupled to one another in a cascading arrangement in that each device driver, other than a first one of the device drivers, has an input coupled to an output of a previous one of the device drivers.

14. The system of claim 12, comprising:
an input interface configured to receive a first serial data signal and to output a second serial data signal; and
a shift register having an input coupled to the input interface and an output coupled to said data latch, said data latch having at its input a latch enable signal for enabling said data latch.

15. The system of claim 14, wherein said power control circuit detects a logic state of data on a signal line at the output of said data latch, said signal line being composed of N data lines, and if the logic state of the data on said N data lines of said signal line is low and a logic state of said latch enable signal is high, said power control circuit delivers said first current, which is lower than said second current, the second current being sufficient to enable said current control circuit to deliver a constant current for powering up said light emitting elements.

16. The system of claim 14, wherein said power control circuit detects a logic state of data on a signal line at the output of said data latch, said signal line being composed of N data lines, and if a logic state of said latch enable signal is high and if a datum on at least one of the N data lines of said signal line is of a logic high value, then said power control circuit delivers said second current sufficient to enable said current control circuit to deliver a constant current for powering up said light emitting elements.

17. The system of claim 12, wherein said output stage has N output lines, each being coupled to a respective one of the light emitting elements.

18. The system of claim 12, wherein said power control circuit is a circuit implemented by a NOR logic gate having N inputs corresponding to N light emitting elements.

19. An electronic apparatus comprising:
a central unit;
a plurality of circuits; and an energy source for supplying power to said central unit and said plurality of circuits, said central unit being structured to control an operation of said plurality of circuits; said plurality of circuits including a video interface having an array of light emitting elements and a driver device for driving said array, the driver device comprising:
    a data latch having an input, configured to receive an input signal, and an output;
    an output stage having an input and being structured to drive said light emitting elements;
    a current control circuit having an input coupled to said data latch and an output coupled to the input of the output stage; and
    a power control circuit having an input coupled to the output of said data latch and an output coupled to the input of the current control circuit, said power control circuit being configured to control said current control circuit and the current control circuit being configured to deliver:
        a first current when data at the input of said power control circuit is in a first state; and
        a second current when at least part of said data at the input of said power control circuit is in a second state.

20. An electronic apparatus as claimed in claim 19, wherein said video interface includes a one-color, multi-color, or full-color LED display.

21. An electronic apparatus as claimed in claim 19, wherein said video interface includes a one-color or multi-color LED signboard.

22. An electronic apparatus as claimed in claim 19, wherein said video interface includes a LED backlit LCD panel.

23. An electronic apparatus as claimed in claim 19, wherein said energy source includes a battery.

24. An electronic apparatus as claimed in claim 19, wherein said energy source includes one or more solar cells.

25. An electronic apparatus as claimed in claim 19 wherein the central unit, plurality of circuits, and energy source comprise an LED display.

26. An electronic apparatus as claimed in claim 19 wherein the central unit, plurality of circuits, and energy source comprise an LED signboard.

27. An electronic apparatus as claimed in claim 19 wherein the central unit, plurality of circuits, and energy source comprise an LED back-light LCD.

* * * * *